United States Patent

[11] 3,631,407

[72] Inventor Douglas A. Cotter
Raleigh, N.C.

[21] Appl. No. 836,514
[22] Filed June 25, 1969
[45] Patented Dec. 28, 1971

[73] Assignee Corning Glass Works
Corning, N.Y.

[54] CHARACTER MEMORY OF REDUCED SIZE
9 Claims, 3 Drawing Figs.

[52] U.S. Cl. .......... 340/173 SP
[51] Int. Cl. .......... G11c 17/00, G11c 11/38
[50] Field of Search .......... 340/173, 174 SP

[56] References Cited

UNITED STATES PATENTS

| | | | |
|---|---|---|---|
| 3,191,040 | 6/1965 | Critchlow .......... | 340/173 X |
| 3,245,054 | 4/1966 | Byron et al. .......... | 340/173 |
| 3,373,406 | 3/1968 | Cannon et al. .......... | 340/173 X |
| 3,245,051 | 4/1966 | Robb .......... | 340/173 |
| 3,377,513 | 4/1968 | Ashby et al. .......... | 340/173 X |
| 3,428,953 | 2/1969 | Baxter et al. .......... | 340/173 |

*Primary Examiner*—Stanley M. Urynowicz, Jr.
*Attorneys*—Clarence R. Patty, Jr., Walter S. Zebrowski and William J. Simmons, Jr.

ABSTRACT: Read-only memory size reduction based on the implication theory of logical mathematics. A different designation number is generated by the memory in response to the application of an interrogation pulse to each of the word line input terminals. If one of the designation numbers implies another designation number, then the latter may be generated from the former with a cross-point impedance element saving which equals the number of logical bits that are common to both designation numbers.

INVENTOR.
Douglas A. Cotter
BY William J. Simmons Jr.
ATTORNEY

CHARACTER MEMORY OF REDUCED SIZE

BACKGROUND OF THE INVENTION

This invention relates to a read-only memory of the type consisting of a matrix of crossed word lines and bit lines wherein a "1" is stored at a particular intersection of word and bit lines by the connection of a cross-point impedance element between those particular lines. More particularly, this invention relates to a read-only memory having a reduced size as a result of the use of fewer than the usual number of cross-point impedance elements therein.

Read-only memories which are so designated because the information stored therein is electrically unalterable, are used wherever a large body of either seldom or never changing data is to be stored and where random access is required. The bit lines of such memories provide binary designation numbers in the form of a series of "1's" and "0's" in the response to the application of an interrogation or readout signal to a particular word line input terminal. A word line signal is coupled to a particular bit line if a cross-point impedance element is present at the appropriate intersection of word and bit lines. The cross-point impedance elements may be linear impedance elements such as resistors, capacitors and the like or nonlinear elements such as diodes, magnetic cores and the like. A "1" is stored if a word line is connected to a bit line through an impedance element, and a "0" is stored if no connection is made at that crossover. When a current pulse is applied to a particular word line, pulses are produced on the bit lines which are connected to that word line, the bypassed bit lines producing no output. By monitoring the bit lines simultaneously, the data is read out.

When one of the word lines is addressed, bits corresponding to this word are read out of the bit lines in parallel. If the matrix has "$m$" words of "$n$" bits each, the size of the memory is $m\times n$, the number of intersections in the matrix. Since cross-point impedance elements are connected at each intersection where it is necessary to indicate a stored "1," the average number of such impedance elements in the matrix has been approximately one-half ($m\times n$) in prior art memories of this type.

SUMMARY OF THE INVENTION

It is an object of the present invention to provide a read-only memory of reduced size. Fabrication of the memory becomes simplified and reliability is improved because such a memory employs fewer components which are subject to failure. A resultant advantage is a lower cost per bit as compared with other read-only memories.

The above objects and advantages are accomplished by providing a read-only memory having less than the usual number of cross-point impedance elements. The theory upon which this reduction is possible is as follows. If number A and number B are designation numbers representing the characters A and B, respectively, and if number A implies number B, then number B has "1's" in at least the positions which correspond to the "1's" of number A. For example, if number A is 1001 and number B is 1011, then number A implies number B. Alternatively, it may be said that number B includes number A.

Briefly, this invention relates to memories of the type which consist of a plurality of word lines crossing a plurality of bit lines, wherein "1's" are stored therein by the connection of cross-point impedance elements between selected ones of said word lines and bit lines. The improvement consists of the connection of unilaterally conducting impedance means between at least one pair of the word lines so that the application of an interrogation pulse to one of the two word lines in that pair causes the generation of a readout pulse in those of the bit lines which are connected by cross-point impedance elements to either of the two word lines in that pair.

DESCRIPTION OF THE PREFERRED EMBODIMENT

The read-only memory of this invention will be described in conjunction with a character generator for a cathode-ray tube display, but it is not limited to such applications. The theory upon which this invention is based is easily understood when it is applied to alphanumeric characters since the visual similarity between certain characters indicates a redundancy in the data used to form the character, and therefore also indicates a redundancy in the elements comprising the character memory. By taking advantage of this redundancy, the number of crossover impedance elements and therefore the cost of the memory can be reduced.

Figure 1:
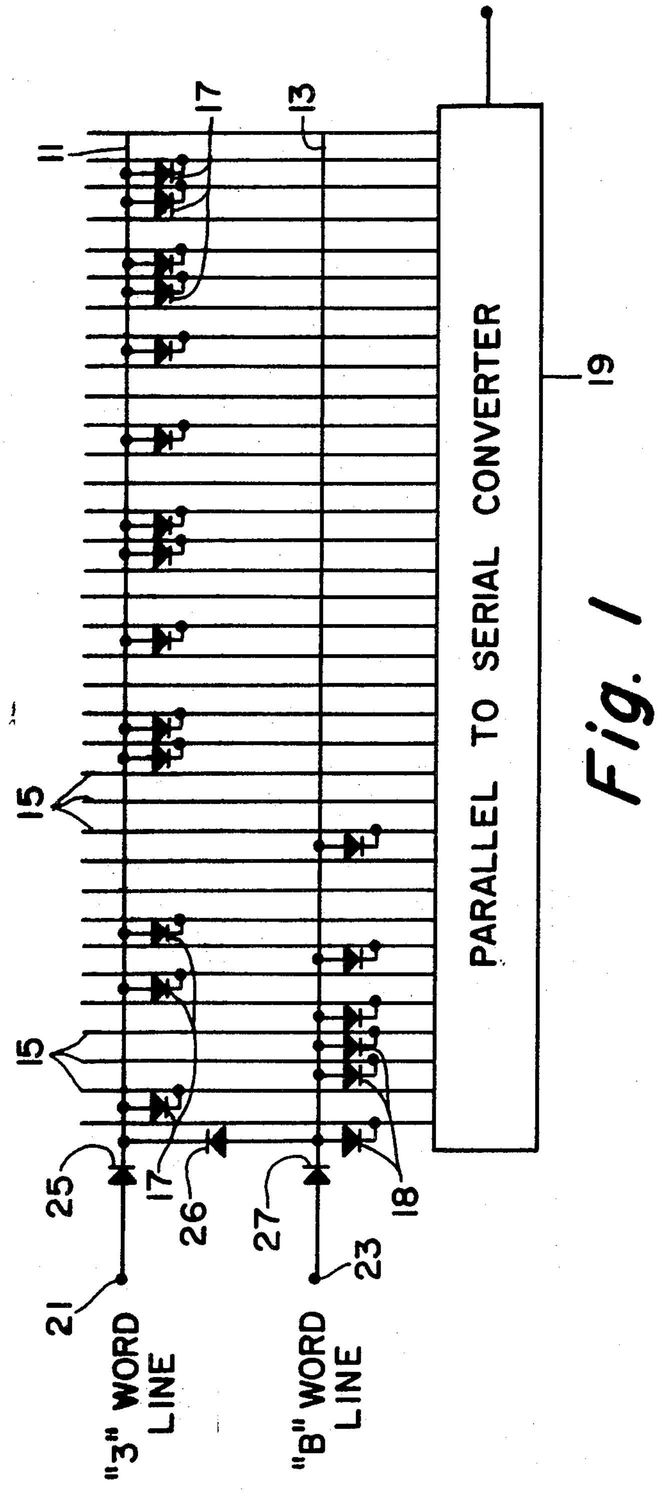
FIG. 1 is a schematic circuit diagram of a portion of a read-only memory that has been simplified in accordance with the present invention.

As schematically illustrated in FIG. 1 a read-only memory may consist of a matrix of word lines 11 and 13 which cross a plurality of bit lines 15. Data is stored in the memory by connecting cross-point impedance elements such as diodes 17 and diodes 18 at the crossovers of those word and bit lines where a "1" is to be stored. If no connection is made at a particular crossover, then a "0" is stored. The total number of word lines is determined by the number of characters to be generated, and the number of bit lines is determined by the number of bits required to generate the designation numbers of the characters. For example, if the designation number is to be utilized to generate a character in a 5×7 dot matrix array such as the type illustrated in FIGS. 2 and 3, then 35-bit lines will be required. The input terminals 21 and 23 are connected to the word lines 11 and 13 by diodes 25 and 27, respectively. When the memory is to be used in conjunction with a cathode-ray tube character generator, the bit lines 15 may be connected to a parallel to serial converter 19 which thereafter provides the designation number to the cathode-ray tube intensity control in serial form.

Figure 2:
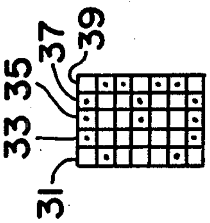
FIGS. 2 and 3 illustrate two characters generated in a dot matrix array.
Figure 3:
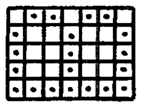

FIGS. 2 and 3 illustrate two different characters, "3" and "B," respectively, which can be generated by a 5×7 dot display on the faceplate of a cathode-ray display tube. For the purpose of illustration, each of these displays is divided into 35 blocks arranged in a 5×7 array. Referring to FIG. 2, the deflection circuitry of the cathode-ray tube causes the electron beam to begin scanning at the bottom of the column 31 and scan upwardly until it reaches the top thereof. During this scan, the beam passes through each of the boxes in that column and, depending on the particular type of display, the beam may actually pause in the center of each of the boxes. When a dot is to be generated in one of the boxes, the intensity of the beam is greatly increased during the time that the beam is deflected to that particular box. After the beam has scanned upwardly through column 31, it is deflected down to the bottom of column 33 and again scans upwardly until it reaches the top. Similarly, the beam scans upwardly through the columns 35, 37 and 39. Each time a dot is to be generated in one of the boxes, the beam intensity is increased.

The information required to generate each dot in any given character is obtained by the connection of a diode or other suitable cross-point impedance element between the word line for that character and one of the bit lines. Since impedance elements such as the diodes shown in FIG. 3 are connected at those intersections of word and bit lines where a "1" is to be stored, the average number of elements in prior read-only memories has been one-half ($m\times n$). The similarity between certain characters indicates a redundancy in the data used to form the characters and therefore, also in the character memory. As an example of data redundancy, consider the characters 3 and B. A visual inspection of these characters illustrated in dot matrix form in FIGS. 1 and 2 indicates that the 3 is contained within the B. The similarity in the data used to generate these two characters in dot matrix form is obvious from a comparison of their designation numbers which appear in table I.

Table I

| Character | Designation Number | | | | |
|---|---|---|---|---|---|
| 3 | 0100010 | 1000001 | 1001001 | 1001001 | 0110110 |
| B | 1111111 | 1001001 | 1001001 | 1001001 | 0110110 |

It can be seen that the character 3 can be changed into the character B by adding to the dot matrix of FIG. 1, five dots in column 31 and a single dot to the middle box in the column 33. Therefore, by generating a "3" and adding six diodes to another word line, a "B" can be generated with a reduction in the number of diodes that is equal to the number of "1's" which is common to both characters. Referring to FIG. 1, the "B" word line 13 is connected to the appropriate six-bit lines by six diodes 18. Since a "3" must also be generated in order to generate a "B," the "B" word line 13 is connected to the "3" word line 11 by a unilaterally conducting impedance element such as the diode 26.

To generate a "3," a positive pulse is applied to the terminal 21 causing current to flow through diode 25 to all of the diodes 17, but the polarity of the diode 26 is such that it blocks the flow of current to the line 13. To generate a "B," a positive pulse is applied to the terminal 23 causing current to flow through the diode 27 to the line 13, and through the diodes 18 to the bit lines connected thereto. Current also flows through diode 26 to the line 11 and thereafter through the diodes 17 to the bit lines connected thereto.

For each implication that is used in the memory, one diode such as the diode 26 must be added to the memory. In the particular example selected to illustrate the present invention, the number of diodes saved by storing a "B" in the memory as indicated above, is the number of diodes required to generate a "3" minus the one diode 26 which is required to connect the lines 11 and 13. The saving in this case amounts to 13 diodes as compared with the case where a total of 34 diodes would be required to store an entire "B" and a "3" in the memory. Although not all characters can satisfy an implication, the overall saving is generally between 20 and 30 percent of the total number of diodes. The overall saving will be greater as the number of words in the memory increases.

This invention is not limited to those cases where one complete character implies another. For example, one word line could be used to store all of the seven dots which make up column 31 in FIG. 2. This complete row of dots is required in the generation of such characters as "B," "D," "E," and "F," to name but a few. When one of these characters is to be generated, a pulse could be applied to a separate word line which would cause the generation of all of the dots in column 31.

If an implication chain can be found in the set of designation numbers stored in a memory, the technique of this invention can be utilized at each level of implication and a considerable saving in cross-point elements can be obtained. For each level of implication used, one unilaterally conducting element such as the diode 26 must be added to the matrix.

I claim:

1. In a read-only memory of the type consisting of a plurality of word lines crossing a plurality of bit lines and a plurality of input terminals respectively connected to said plurality of word lines for receiving interrogation pulses, wherein "1's" are stored in said memory by the connection of cross-point impedance elements between selected ones of said word lines and bit lines, the improvement comprising unilaterally conducting impedance means connected between at least a first and a second of said plurality of word lines, said unilaterally conducting impedance means presenting a low impedance to interrogation pulses applied to the terminal associated with said first word line so that the application of an interrogation pulse to said first word line generates a readout pulse in those of said bit lines which are connected by said cross-point impedance elements to both said first and said second word lines, and said unilaterally conducting impedance means presenting a high impedance to interrogation pulses applied to the terminal associated with said second word line so that the application of an interrogation pulse to said second word line generates a readout pulse in only those of said bit lines which are connected by said cross-point impedance elements to said second word line.

2. A read-only memory in accordance with claim 1 wherein said unilaterally conducting impedance means is a diode, one terminal of which is directly connected to said first word line and the other terminal of which is directly connected to said second word line.

3. A read-only memory in accordance with claim 2 wherein said cross-point impedance elements are diodes.

4. A read-only memory in accordance with claim 1 wherein no bit line is connected by cross-point impedances to both said first and said second word lines.

5. In a read-only memory comprising a plurality of word lines, a plurality of bit lines, cross-point impedance elements connecting those of said word lines to those of said bit lines where "1's" are to be stored, and a plurality of input terminals respectively connected to said plurality of word lines for receiving interrogation pulses, wherein a unique designation number in the form of a series of "1's" and "0's" is generated on said bit lines in response to the application of an interrogation pulse to a particular one of said word lines, and wherein the designation number generated by the application of an interrogation pulse to at least one of said word lines implies the designation number generated by the application of an interrogation pulse to at least one other of said word lines, the improvement comprising unilaterally conducting impedance means for transmitting an interrogation pulse applied to said one other word line to said one word line and impeding the transmission of an interrogation pulse from said one word line to said one other word line, said unilaterally conducting impedance means having a first terminal connected directly to said first word line and a second terminal connected directly to said second word line.

6. A read-only memory in accordance with claim 5 wherein said unilaterally conducting impedance means is a diode.

7. In a read-only memory comprising a plurality of word lines, a plurality of bit lines, cross-point impedance elements connecting those of said word lines to those of said bit lines where "1's" are to be stored, and a plurality of terminals respectively connected to said plurality of word lines for receiving interrogation pulses, the improvement comprising a diode having one terminal directly connected to a first of said word lines, the other terminal of said diode being directly connected to a second of said word lines.

8. A read-only memory in accordance with claim 7 wherein no bit line is connected by cross-point impedances to both said first and said second word lines.

9. A read-only memory in accordance with claim 8 further comprising a plurality of input diodes, one of which connects each of said plurality of terminals to its associated word line, the polarity of said input diodes being such that interrogation pulses applied to said terminals conduct through said input diodes to said word lines.

* * * * *